US012619630B2

(12) United States Patent
Gorenta et al.

(10) Patent No.: US 12,619,630 B2
(45) Date of Patent: May 5, 2026

(54) SYSTEMS AND METHODS FOR STAGING OF DATA UPDATES TO DATABASE SYSTEM IN A MULTI-TENANT SYSTEM

(71) Applicant: Zuora, Inc., Redwood City, CA (US)

(72) Inventors: Sai Ram Rakesh Gorenta, Lathrop, CA (US); Manikandan Chockalingam, Chandler, AZ (US); Jingjing Pang, Beijing (CN); Qiang Wu, Beijing (CN); Yi Feng, Tianjin (CN)

(73) Assignee: Zuora, Inc., Redwood City, CA (US)

( * ) Notice: Subject to any disclaimer, the term of this patent is extended or adjusted under 35 U.S.C. 154(b) by 0 days.

(21) Appl. No.: 18/769,214

(22) Filed: Jul. 10, 2024

(65) Prior Publication Data

US 2026/0017281 A1     Jan. 15, 2026

(51) Int. Cl.
    *G06F 16/00*     (2019.01)
    *G06F 16/21*     (2019.01)
    *G06F 16/22*     (2019.01)
    *G06F 16/25*     (2019.01)
    *G06F 16/27*     (2019.01)

(52) U.S. Cl.
    CPC ............ *G06F 16/27* (2019.01); *G06F 16/213* (2019.01); *G06F 16/2282* (2019.01); *G06F 16/256* (2019.01)

(58) Field of Classification Search
    CPC .... G06F 16/27; G06F 16/213; G06F 16/2282; G06F 16/256
    See application file for complete search history.

(56) References Cited

U.S. PATENT DOCUMENTS

| | | | |
|---|---|---|---|
| 2020/0183939 A1* | 6/2020 | Lashmet | ........... G06F 16/24554 |
| 2022/0207061 A1* | 6/2022 | Failer | .................. G06F 16/2282 |

FOREIGN PATENT DOCUMENTS

| | | | | |
|---|---|---|---|---|
| WO | WO-2023081921 A9 * | 6/2023 | ............. | G06Q 40/08 |

* cited by examiner

*Primary Examiner* — Alexander Khong
(74) *Attorney, Agent, or Firm* — Fish & Richardson P.C.

(57)         ABSTRACT

The multi-tenant system includes one or more hardware processors that extract standard fields from one or more objects stored in source database systems, the standard fields defining standard subscription attributes. The hardware processors map the standard fields to records within a destination database system, obtain customized fields defining tenant-selected subscription attributes, obtain a mapping of the customized fields to the records; append the standard fields to the customized fields to form appended fields; schedule a pipeline to ingest the appended fields into the records within the destination database system, and ingest the appended fields into the records within the destination database system in order to stage the appended fields into the destination database system.

18 Claims, 12 Drawing Sheets

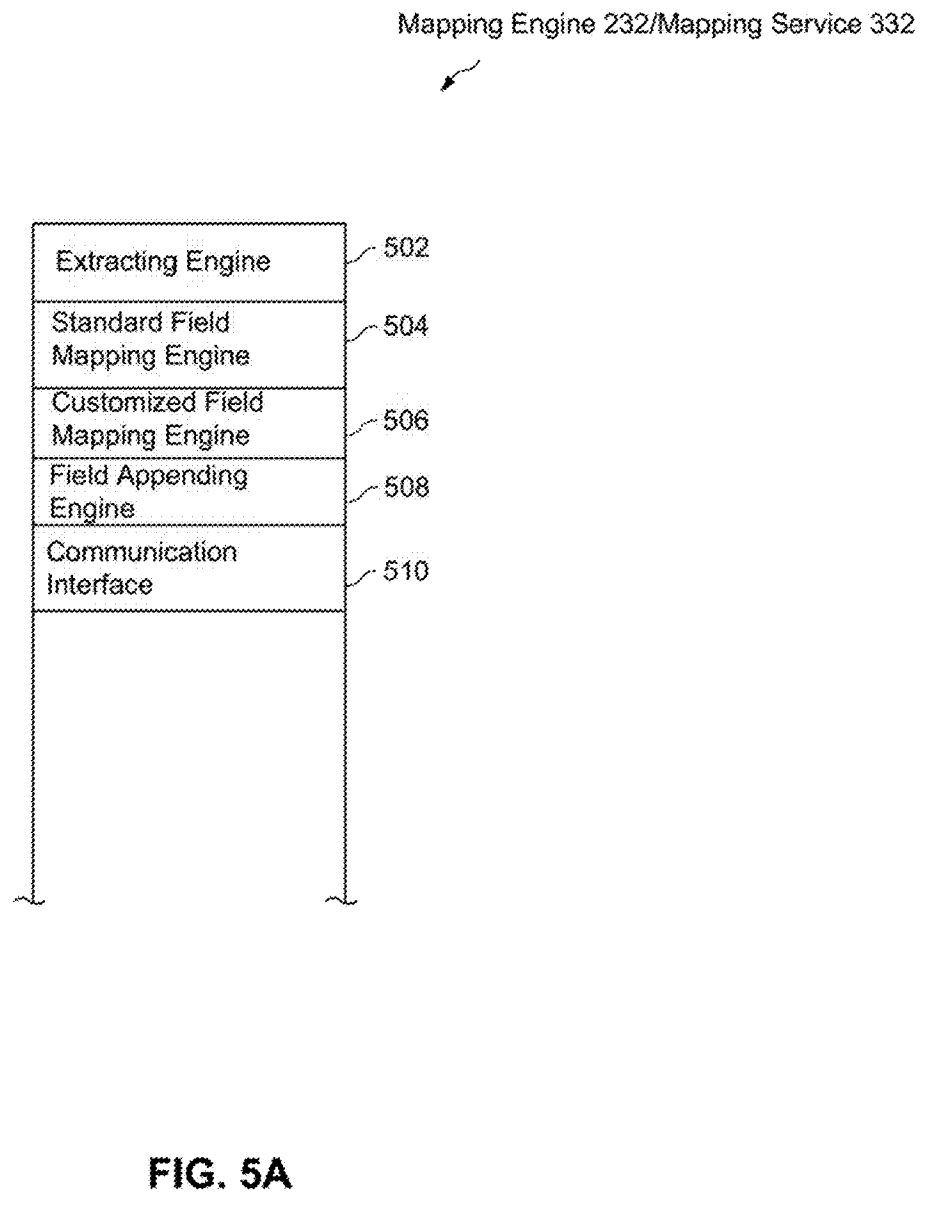

Mapping Engine 232/Mapping Service 332

502 — Extracting Engine

504 — Standard Field Mapping Engine

506 — Customized Field Mapping Engine

508 — Field Appending Engine

510 — Communication Interface

FIG. 5A

Standard Field Mapping Engine 404

602

604

Vested Event Mapping Engine

Unvested Event Mapping Engine

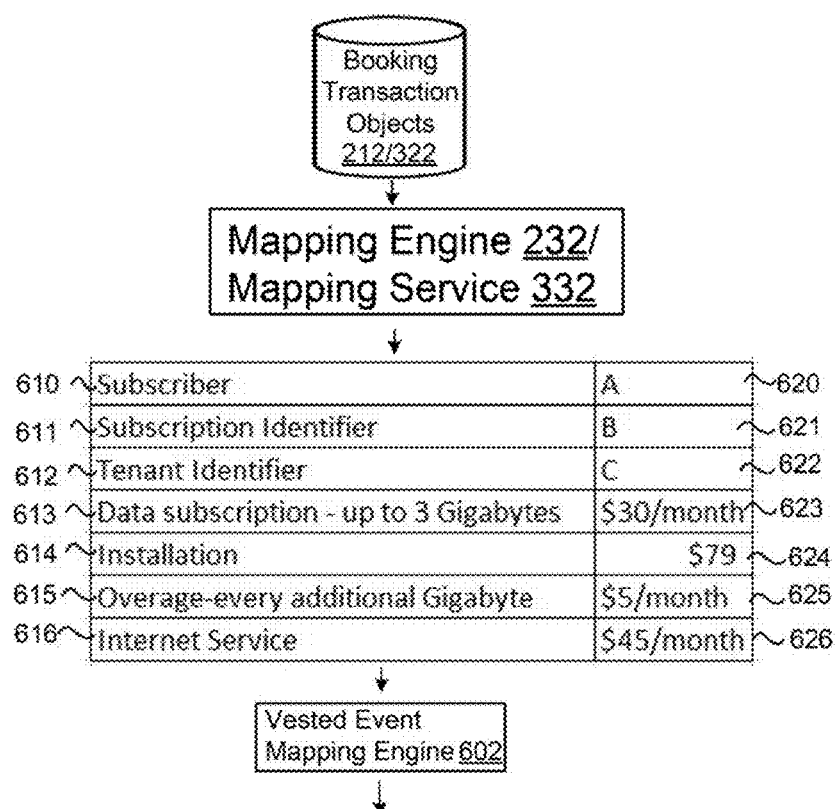
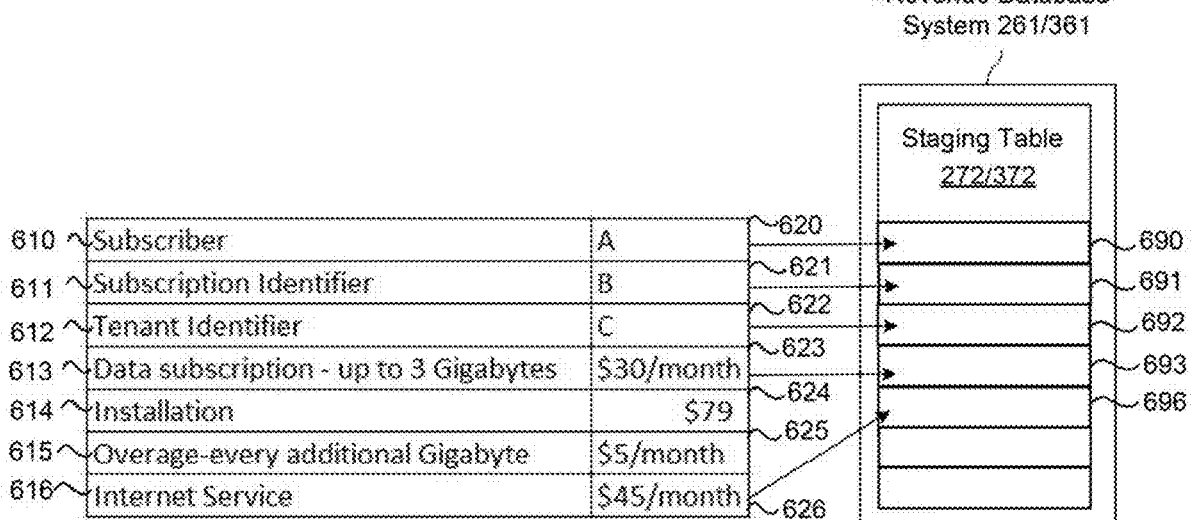
FIG. 6B

700

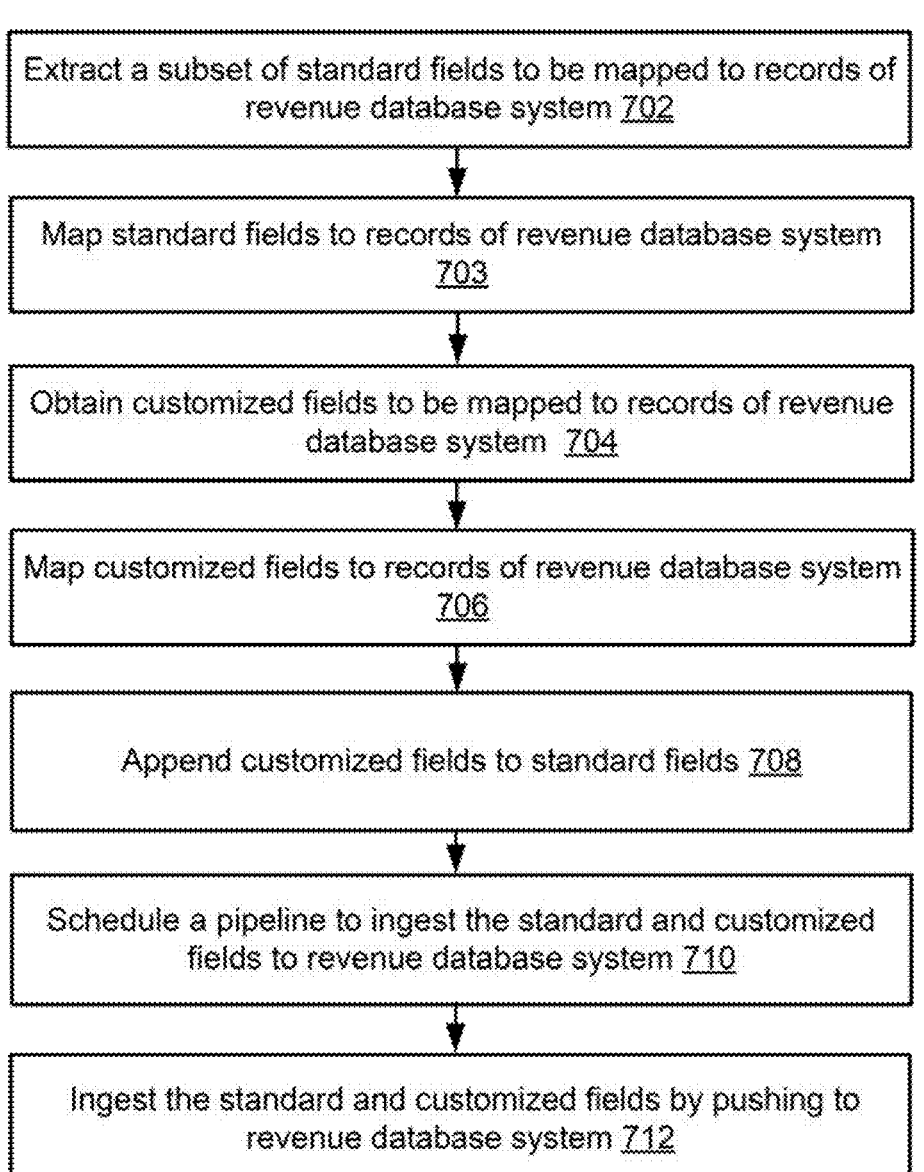

Extract a subset of standard fields to be mapped to records of revenue database system 702

↓

Map standard fields to records of revenue database system 703

↓

Obtain customized fields to be mapped to records of revenue database system  704

↓

Map customized fields to records of revenue database system 706

↓

Append customized fields to standard fields 708

↓

Schedule a pipeline to ingest the standard and customized fields to revenue database system 710

↓

Ingest the standard and customized fields by pushing to revenue database system 712

FIG. 7

SYSTEMS AND METHODS FOR STAGING OF DATA UPDATES TO DATABASE SYSTEM IN A MULTI-TENANT SYSTEM

CROSS-REFERENCE TO OTHER APPLICATIONS

The present application incorporates by reference U.S. Pat. No. 11,409,586, entitled "Extending Data Model of Monolithic Database Through a Microservice for a Multi-Tenant Platform."

TECHNICAL FIELD

This disclosure pertains to streamlining staging of data updates to a database system within a multi-tenant system.

BACKGROUND

Within a multi-tenant system, different database systems may perform specialized functions. For example, a booking database system may record and manage new subscriptions and/or modifications to existing subscriptions. A billing database system may generate invoices, memos, and related items for subscriptions. A revenue database system may recognize, categorize, and report revenue based on accounting rules and according to updates within the booking database system and the billing database system. Updates within the billing database system and the booking database system are staged within the revenue database system. Because of different data shapes of different types of subscription events and different client requirements, a method of streamlining staging of data updates between the different database systems is needed.

SUMMARY

A claimed solution rooted in computer technology overcomes problems specifically arising in the realm of computer technology. Embodiments of the present invention implement a staging system, within a multi-tenant system, that efficiently streamlines staging of updates, such as subscription related data updates, from booking and/or billing database systems to one or more revenue database systems. Staging may refer to pushing of relevant data fields to a staging area (e.g., a staging table or other table) of the revenue database system or other database system. Currently, bottlenecks exist in staging updates to the revenue database system. For example, some current implementations rely on the revenue database system pulling data from the booking and/or billing database systems. These implementations have limitations, including heavy transformation logic being required to track data from the booking and/or billing database systems to the revenue database system. These implementations may also result in more data being pulled than necessary for the revenue database system. Another limitation is that these implementations are largely a synchronous process. The requirement for the revenue database system to pull data from the booking and/or billing database systems means that the revenue database system may be restricted from performing other workflow tasks, which decreases efficiency of the entire multi-tenant system. These implementations may also cause violation of an accounting principle, specifically, the segregation of duties of Accounting Standards Codification (ASC) 606 because the revenue database system is responsible for revenue recognition as well as booking generation. Additionally, potential inconsistencies of data between the billing database system and the booking database system may not be resolvable by the revenue database system.

Embodiments of the present invention overcome these bottlenecks. Embodiments of the present invention implement a staging system that obtains booking and/or billing updates, extracts a subset of relevant fields from the booking and/or billing updates, and stages the subset of relevant fields within particular records of the revenue database system. The booking and/or billing updates may be manifested as booking and/or billing transaction objects within the booking and/or billing database systems. The staging system may define a mapping, such as a schema mapping, from the relevant fields within the booking and/or billing transaction objects to records within the revenue database system. In some embodiments, the records may include a table, a row, and/or a column, and/or correspond to particular locations, addresses, and/or identifiers of the revenue database system. The staging system ingests the subset of relevant fields to the records within the revenue database system based on the mapping. Because of the mapping, the staging system provides relevant updates to the revenue database system in near real-time. Additionally, the mapping enables the subset of relevant fields to be pushed into specific records of the revenue database system. This avoids the revenue database system needing to additionally map the relevant fields into the correct records, and expedites the execution of workflows within the revenue database system.

Because of this mapping, the staging system may provide relevant updates to the revenue database system in near real-time according to any data updates arising within any of the booking and/or billing database systems. The staging system extracts the relevant fields, and automatically pushes the extracted fields to the mapped records within the revenue database system in near real-time. In some embodiments, the different records, or groups of records, within the revenue database system may correspond to or trigger different workflow actions being performed. A previously synchronous process which requires the revenue database system to have a deep understanding of operations within the booking and/or billing database systems has now been transformed into an asynchronous process, which frees up the revenue database system to perform workflow tasks and reduces the burden on the revenue database system.

The previously alluded to fields may include standard fields. In some embodiments, the staging system also provides versatility of receiving customized fields, mapping the customized fields to records within the revenue database system, and appending the customized fields to the corresponding standard fields. The customized fields may have originated from and been obtained from different sources besides the one or more source platforms. These sources may include, for example, any client systems such as tenant interfaces configured to receive inputs from a tenant. These customized fields may be utilized by the revenue database system platform for further workflow processes, such as generating of reports, communicating with other database systems, and/or configuring webhooks with other database systems. Thus, the added versatility of receiving and ingesting customized fields provides capabilities of reporting and/or monitoring to adapt to different needs of tenants.

Embodiments of the invention implement a multi-tenant system. The multi-tenant system includes one or more hardware processors; and memory storing computer instructions. The computer instructions, when executed by the one or more hardware processors, are configured to perform extracting one or more standard fields from one or more source database systems (e.g., booking and/or billing database systems). The one or more standard fields may correspond to an upstream event. The standard fields may be extracted from one or more objects (e.g., booking and/or billing transaction objects) stored in the booking and/or billing database systems. The standard fields define standard subscription attributes, including subscription product information, a subscriber identifier, a tenant identifier, and a subscription status or a billing status corresponding to the subscription product information. The computer instructions, when executed by the one or more hardware processors, are further configured to perform mapping the one or more standard fields to one or more records within a destination database system (e.g., a revenue database system) and obtaining one or more customized fields. The customized fields may also correspond to the upstream event. The obtaining of the one or more customized fields may be from a tenant interface. The customized fields may define tenant-selected subscription attributes. The computer instructions, when executed by the one or more hardware processors, are further configured to perform obtaining a mapping of the one or more customized fields to the one or more records (e.g., from the tenant interface); appending the one or more standard fields to the one or more customized fields to form appended fields; scheduling a pipeline to ingest the appended fields into the one or more records within the destination database system; and ingesting the appended fields into the one or more records within the destination database system in accordance with the mapping and the scheduled pipeline, in order to stage the appended fields into the destination database system.

In some embodiments, the one or more records comprise columns or rows within a table; and the mapping of the one or more standard fields to the one or more records comprises selecting a particular table within the destination database system into which a particular standard field of the standard fields is ingested based on a classification of the particular standard field.

In some embodiments, the classification is indicative of a vesting status corresponding to the standard field, the vesting status indicating whether the particular standard field corresponds to a vesting event.

In some embodiments, the mapping of the one or more standard fields to the one or more records comprises mapping a standard field to a staging table if the standard field corresponds to a vesting event and mapping the standard field to a pre-staging table if the standard field corresponds to a nonvesting event.

In some embodiments, the one or more standard fields comprise one or more first standard fields, the one or more customized fields comprise one or more first customized fields, the one or more first standard fields corresponding to a first event of a first event type, the one or more records comprises one or more first records. The computer instructions when executed by the one or more hardware processors are further configured to perform extracting one or more second standard fields corresponding to a second event from one or more source database systems, the second event being of a second event type; mapping the one or more second standard fields to one or more second records within a revenue database system; and wherein the scheduling of the pipeline comprises partitioning the appended first fields and the one or more second standard fields based on different event types.

In some embodiments the computer instructions when executed by the one or more hardware processors are further configured to perform obtaining one or more second customized fields corresponding to the second event from the tenant interface; obtaining, from the tenant interface, a mapping of the one or more second customized fields to the one or more second records from the tenant interface; and appending the one or more second standard fields to the one or more second customized fields to form second appended fields, wherein the scheduling of the pipeline comprises partitioning the appended first fields and the appended second fields based on the different event type.

In some embodiments, the scheduling of the pipeline comprises partitioning the appended first fields into a separate partition as the one or more second standard fields.

In some embodiments, the instructions when executed by the one or more hardware processors are further configured to perform normalizing the extracted one or more standard fields and the obtained one or more customized fields according to a standardized format compatible with the destination database system.

In some embodiments, the destination database system is configured to recognize events based on the ingested appended fields and perform workflow operations based on the recognized events.

In some embodiments, the one or more customized fields are included in an output of the performed workflow operations.

In some embodiments, the scheduling of the pipeline comprises scheduling an ingestion of the appended first fields at least partially in parallel with an ingestion of the appended second fields.

In some embodiments, the one or more booking and/or billing database systems comprise a billing database system configured to generate and record the generation of invoices and other billing items and a booking database system configured to record one or more subscription events.

In some embodiments, the revenue database system is configured to recognize revenue events based on the ingested appended fields and perform workflow operations based on the recognized revenue events.

Embodiments of the invention implement a method implemented by a multi-tenant system. The method comprises extracting one or more standard fields, which may correspond to an upstream event, from one or more source database systems (e.g., the booking and/or billing database systems). The standard fields define standard subscription attributes, which may include subscription information including subscription product information, a subscriber identifier, a tenant identifier, and a subscription status or a billing status corresponding to the subscription product information. The method comprises mapping the one or more standard fields to one or more records within a destination database system (e.g., the revenue database system) and obtaining one or more customized fields defining tenant-selected subscription attributes. The customized fields may correspond to the upstream event. The method comprises obtaining a mapping of the one or more customized fields to the one or more records from the tenant interface; appending the one or more standard fields to the one or more customized fields to form appended fields; scheduling a pipeline to ingest the appended fields into the one or more records within the downstream database system; and ingesting the appended fields into the one or more records within the downstream database system in order to stage the appended fields into the destination database system.

In some embodiments, the method further comprises recognizing, by the destination database system, events based on the ingested appended fields and performing work-flow operations based on the recognized events.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like refer-ence numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

FIG. 5A is a block diagram illustrating a mapping engine within the staging systems, in accordance with some embodiments of the present invention.

FIG. 6B is a block diagram illustrating an example standard field mapping engine, in accordance with some embodiments of the present invention.

FIG. 7 is a flowchart illustrating a method of staging the revenue database system according to updates to the book-ing and/or billing database systems, in accordance with some embodiments of the present invention.

DETAILED DESCRIPTION

Figure 1:
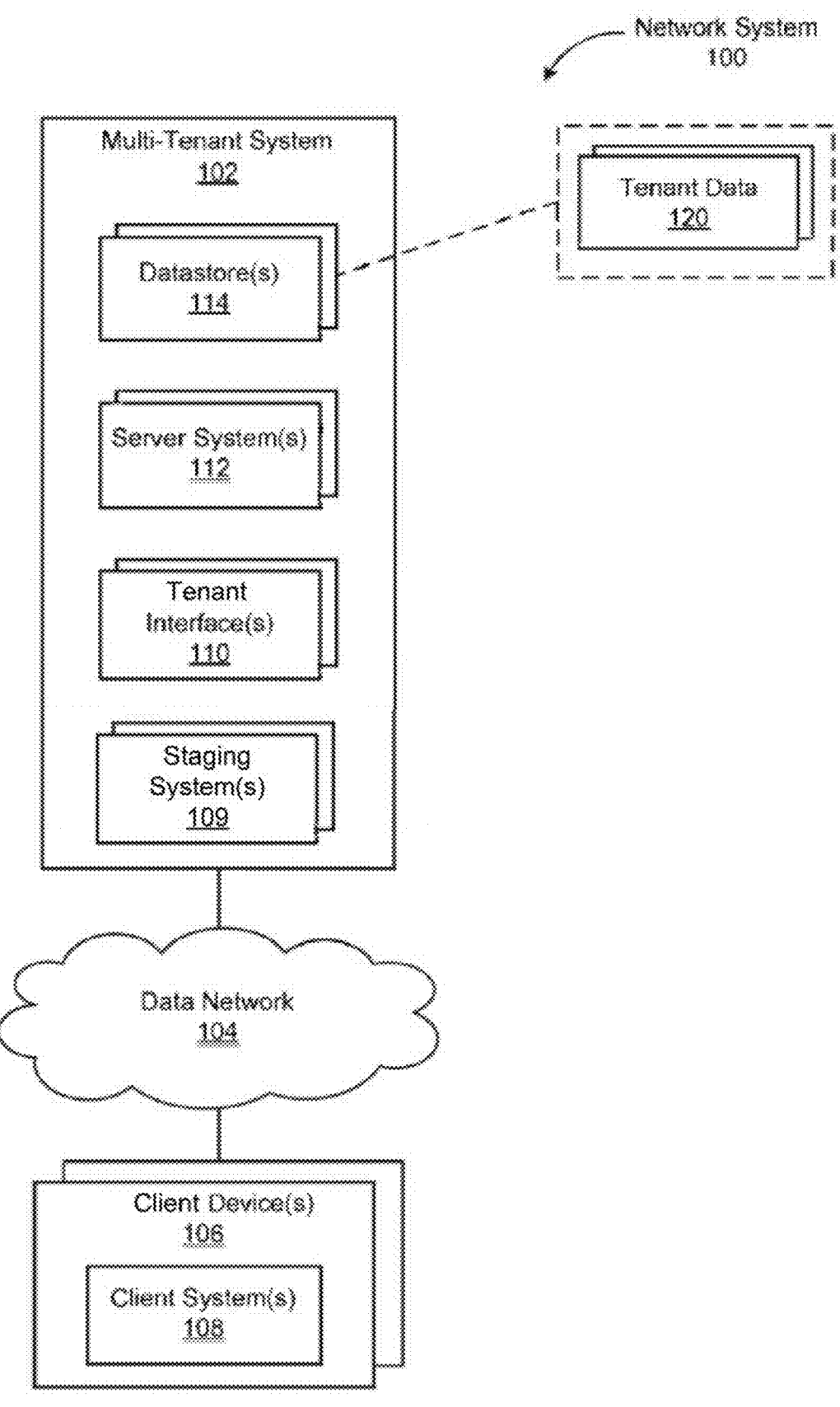
FIG. 1 is a block diagram illustrating a network system for providing cloud-based software-as-a-service (SAAS) ser-vices of a multi-tenant system to multiple tenants, in accor-dance with some embodiments of the present invention.

A claimed solution rooted in computer technology over-comes problems specifically arising in the realm of com-puter technology.

Embodiments of the present invention implement a stag-ing system that obtains booking and/or billing updates, extracts a subset of relevant fields from the booking and/or billing updates, and stages the subset of relevant fields within particular records of the revenue database system. Staging may refer to pushing of relevant data fields to a staging area (e.g., a staging table or other table) of the revenue database system or other database system. The booking and/or billing updates may be manifested as book-ing and/or billing transaction objects within the booking and/or billing database systems. The staging system may define a mapping, such as a schema mapping, from the relevant fields within the booking and/or billing transaction objects to records within the revenue database system. In some embodiments, the records may include a table, a row, and/or a column, and/or correspond to particular locations, addresses, and/or identifiers of the revenue database system. The staging system ingests the subset of relevant fields to the records within the revenue database system based on the mapping. Because of the mapping, the staging system pro-vides relevant updates to the revenue database system in near real-time. Additionally, the mapping enables the subset of relevant fields to be pushed into specific records of the revenue database system. This avoids the revenue database system needing to additionally map the relevant fields into the correct records, and expedites the execution of work-flows within the revenue database system. For example, these workflows may include generating of reports, com-munications with one or more other database systems via initiation of application programming interfaces (APIs) and/or webhooks, and/or recording or logging of events such as revenue recognition events.

Because of this mapping, the staging system may provide relevant updates to the revenue database system in near real-time according to any data updates arising within any of the booking and/or billing database systems. The staging system extracts the relevant fields, and automatically pushes the extracted fields to the mapped records within the revenue database system in near real-time. In some embodiments, the different records, or groups of records, within the revenue database system may correspond to or trigger different workflow actions being performed. A previously synchro-nous process which requires the revenue database system to have a deep understanding of operations within the booking and/or billing database systems has now been transformed into an asynchronous process, which frees up the revenue database system to perform workflow tasks and reduces the burden on the revenue database system.

In some embodiments, the updates may include event updates related to a new or existing subscription. An event may encompass a new subscription, a modification to an existing subscription (e.g., a debooking, rebooking, renewal, or early cancellation), a new invoice or other billing item, and/or a modification of a previous invoice or billing item. The subscription may indicate or be related to a resource (e.g., a product or a service) that is distributed via a distribution source. The distribution source may include a digital application store (e.g., Google Play®, Apple App Store®, Amazon Prime®, Roku®), and/or server that hosts or makes available subscription resources that are provided by a provisioning entity, such as a tenant which coordinates distribution of the resource to subscribers. In some examples, the distribution source may include any other server that distributes the subscription resources. The stag-ing system may also monitor or track statuses regarding the subscription resources, such as subscription-based statuses of consuming entities (e.g., individual users or subscribers)

who may consume any of the resource, as subscribers of a tenant. In some embodiments, an event may relate to subscription-based statuses of consuming entities (e.g., individual users or subscribers) who may consume any of the subscription resource.

The previously alluded to fields may include standard fields. In some embodiments, the staging system also provides versatility of receiving customized fields (e.g., tenant-specific customized fields), mapping the customized fields to records within the revenue database system, and appending the customized fields to the corresponding standard fields. The customized fields may have originated from and been obtained from different sources besides the one or more source platforms. These sources may include, for example, any client systems such as tenant interfaces configured to receive inputs from a tenant. These customized fields may be utilized by the revenue database system platform for further workflow processes, such as generating of reports, communicating with other database systems, and/or configuring webhooks with other database systems. Thus, the added versatility of receiving and ingesting customized fields provides capabilities of reporting and/or monitoring to adapt to different needs of tenants.

FIG. 1 depicts a diagram of an example network system 100 for providing cloud-based software-as-a-service (SAAS) services of a multi-tenant system 102 to multiple tenants according to some embodiments. Examples of the cloud-based SAAS services include data storage, data processing, and business-oriented applications. In some embodiments, each tenant may be a provisioning entity, such as a subscription-based entity or provider of resources (e.g., an internet service provider, a home security system and service provider, a cellular phone service provider, or entertainment content provider). Each tenant may additionally or alternatively include a group of one or more users (e.g., individuals, business entities, customers of the business entities, systems) who share access to the cloud-based services. In one embodiment, a tenant includes a service entity such as AT&T, Netflix, Verizon, and/or the like. A tenant may include one or more products or services of an entity. For example, AT&T internet products may be a particular tenant, and AT&T security products may be another tenant. In some embodiments, the cloud-based SAAS services relate to managing subscriber records, product and/or service consumption information, billing information, payment information, and/or the like.

The network system 100 includes the multi-tenant system 102 coupled via a data network 104 (e.g., a set of one or more public and/or private, wired and/or wireless networks) to client devices 106. The multi-tenant system 102 includes shared resources to host the cloud-based SAAS services to the tenants. The shared resources may include processors, memory, virtual systems, services, application programs, load balancers, firewalls, and/or the like. As shown, the multi-tenant system 102 includes tenant interfaces 110, server systems 112, datastores 114, and staging systems 109. Each of the client devices 106 includes a client system 108 that accesses the cloud-based SAAS services hosted by the multi-tenant system 102. In some embodiments, the client systems 108 may be operated by employees (e.g., administrator users) of the provider of the multi-tenant system 102. In some embodiments, the client systems 108 may be operated by employees of the tenant. In some embodiments, the client systems 108 may be operated by end users of the tenant's services.

Each client device 106 may include a desktop, laptop, notebook, tablet, personal digital assistant, smart phone, or other consumer electronic devices incorporating one or more computer components. The client system 108 on each client device 106 may include hardware, software and/or firmware for communicating with the multi-tenant system 102 and accessing the cloud-based services it hosts. Examples of the client systems 108 may include web browsers, client engines, drivers, user interface components, proprietary interfaces, and/or the like.

The multi-tenant system 102 includes hardware, software and/or firmware to host the cloud-based services for the tenants. It will be appreciated that the typical multi-tenant system 102 may offer access to shared resources including systems and applications on shared devices and offer each tenant the same quality or varying qualities of service. In some embodiments, the multi-tenant system 102 does not use virtualization or instantiation processes. In some embodiments, a multi-tenant system 102 integrates several business computing systems into a common system with a view toward streamlining business processes and increasing efficiencies on a business-wide level.

In some embodiments, the multi-tenant system 102 includes a user interface tier of multiple tenant interfaces 110, a server tier of multiple server systems 112, and a datastore tier of multiple datastores 114 for the multiple tenants. In some embodiments, the tenant interfaces 110 includes graphical user interfaces and/or web-based interfaces to enable tenants to access the shared services hosted by the multi-tenant system 102. The tenant interfaces 110 may support load balancing when multiple tenants (and/or multiple customers of the tenants) try to access the multi-tenant system 102 concurrently. The tenant interfaces 110 may additionally or alternatively include an operator interface for use by a systems operator to configure or otherwise manage the multi-tenant system 102. In some embodiments, tenants may input one or more customized fields via the tenant interfaces 110 to be stored within datastores 114 and processed by the staging systems 109. In some embodiments, each tenant may be associated with a subset of the total tenant interfaces 110 for load balancing.

In some embodiments, the server systems 112 include hardware, software and/or firmware to host the shared services for tenants. The hosted services may include tenant-specific business services or functions, including enterprise resource planning (ERP), customer relationship management (CRM), eCommerce, Human Resources (HR) management, payroll, financials, accounting, calendaring, order processing, subscription billing, inventory management, supply chain management (SCM), collaboration, sales force automation (SFA), marketing automation, contact list management, call-center support, web-based customer support, partner and vendor management systems, product lifecycle management (PLM), financial, reporting and analysis, and/or the like. Similar to the tenant interfaces 110, in some embodiments, the server systems 112 may support load balancing when multiple tenants (and/or multiple customers of tenants) try to access the multi-tenant system 102 concurrently. Further, in some embodiments, each tenant may be associated with a subset of the total server systems 112 for load balancing. In some embodiments, the staging systems 109 include hardware, software and/or firmware to perform obtaining data updates from one or more booking and/or billing database systems, extracting a relevant subset of fields from the obtained data updates, mapping the extracted fields to one or more revenue database systems, pipelining and ingesting the extracted subset of fields to the one or more revenue database systems according to the mapping. Once the extracted fields are ingested into the one or more revenue database systems, the extracted fields may be used for workflow processes such as reporting, analysis, communication, and/or other operations.

In some embodiments, tenant data 120 for each tenant may be stored in a logical store across one or more datastores 114. In some embodiments, each tenant uses a logical store that is not assigned to any predetermined datastores 114. Each logical store may contain tenant data 120 that is used, generated and/or stored as part of providing tenant-specific business services or functions. In some embodiments, the datastores 114 may include relational database management systems (RDBMS), MySQL relational database systems, object-based database systems, and/or the like. In some embodiments, tenant data 120 may be stored across multiple datastores 114, with each datastore dedicated to a particular service (e.g., managing customer records, managing subscription data, managing product and/or service consumption information, managing billing information, managing payment information, and/or the like). In some embodiments, any of the datastores 114 may store information regarding any updates or event notifications. In some examples, the tenant data 120 may originally have been ingested into the datastores(s) 114 from different sources (e.g., servers that host resources being provisioned by a tenant).

In some embodiments, although the datastores 114, the server systems 112, the tenant interfaces 110, and the staging systems 109 are shown separately, the separation is shown as merely an example of different aspects of the multi-tenant system 102. Any of the datastores 114, the server systems 112, the tenant interfaces 110, and the staging systems 109 may be integrated together and/or communicate or collaborate with one another. For example, the server systems 112 and the staging systems 109 may be integrated into a single system.

In some embodiments, the tenant data 120 may include information regarding resources that are distributed to consuming entities. The information may include statuses of the resources (e.g., which consuming entities are subscribed to the resources), and a provisioning entity (e.g., tenant or tenant identifier) that coordinates distribution of the resources. In some embodiments, the tenant data 120 may include subscription data, such as billing data, subscription status (e.g., active, canceled, suspended, re-activated), and/or geospatial data. Billing data may include billing invoice data (e.g., date of invoices and invoice amounts, overage charge dates and overage charge amounts), payment transaction data (e.g., date of payments, amount of payments), payment methods (e.g., credit card, debit card), payment plan (e.g., annual billing, monthly billing), and/or service plan information (e.g., the name of a service plan). Subscription information may also include a geographic region and/or location associated with a tenant, service, and/or subscriber. In some embodiments, the tenant data 120 may include usage data (e.g., account activity data), such as new subscriptions, changes to subscribed products and/or services, cancellation of one or more products and/or services, subscriptions to new products and/or services, application of discounts, loyalty program package changes (e.g., additional programs and/or services, special rates, and/or the like for loyal customers), reduction or increase of rates for products and/or services, and/or cancellation of the application. In some embodiments, account activity may include usage of a product and/or product of a subscriber (e.g., what programs or content the subscriber actually watches, what services and what level of consumption the subscriber receives, quality of the product and/or services, and/or the like).

In some embodiments, the tenant data 120 may be stored in one or more data formats (or, simply, formats). For example, subscription tenant data may be stored in a particular format, and usage tenant data may be stored in another format. As used herein, formats may include data types, variable types, protocols (e.g., protocols for accessing, storing, and/or transmitting data), programming languages, scripting languages, data value parameters (e.g., date formats, string lengths), endpoint locations and/or types, and/or the like.

In some embodiments, the tenant data 120 may be stored in one or more monolithic databases and in one or more custom field databases. As stated above, the tenant data 120 may be stored in different records, e.g., a subscription record, a usage record, a billing record, etc. Each record may be managed by a particular record object, e.g., a subscription record object, a usage record object, a billing record object, etc. Each record object may manage a number of global fields that are common to all of the tenants. For example, the global fields for a subscription record for each and every tenant may include record ID, a username, a subscription identifier, etc. The global fields may be stored in the monolithic database. Notably, different tenants may require different additional fields to store information for different record objects. For example, a first tenant may require two custom fields for a subscription record and one custom field for a usage record. Another tenant may require three custom fields for a subscription record and four custom fields for a usage record. Data for these custom fields can be stored in a custom field database for each record for each tenant.

The monolithic and custom field databases of the multi-tenant system 102 may manage (e.g., create, read, update, delete) tenant data 120 using different formats, different protocols, etc. A monolithic application will control data storage in the monolithic database. A custom field service (microservice) will control data storage in the custom field database. It will be appreciated that as used herein, a "service" may be single service and/or a set of services (e.g., a cluster of services).

The data network (or, communication network) 104 may represent one or more computer networks (e.g., LAN, WAN, or the like) or other transmission mediums. The data network 104 may provide communication between the systems, engines, datastores, components, and/or devices described herein. In some embodiments, the data network 104 includes one or more computing devices, routers, cables, buses, and/or other network topologies (e.g., mesh, and the like). In some embodiments, the data network 104 may be wired and/or wireless. In various embodiments, the data network 104 may include the Internet, one or more wide area networks (WANs) or local area networks (LANs), one or more networks that may be public, private, IP-based, non-IP based, and so forth.

Figure 2:
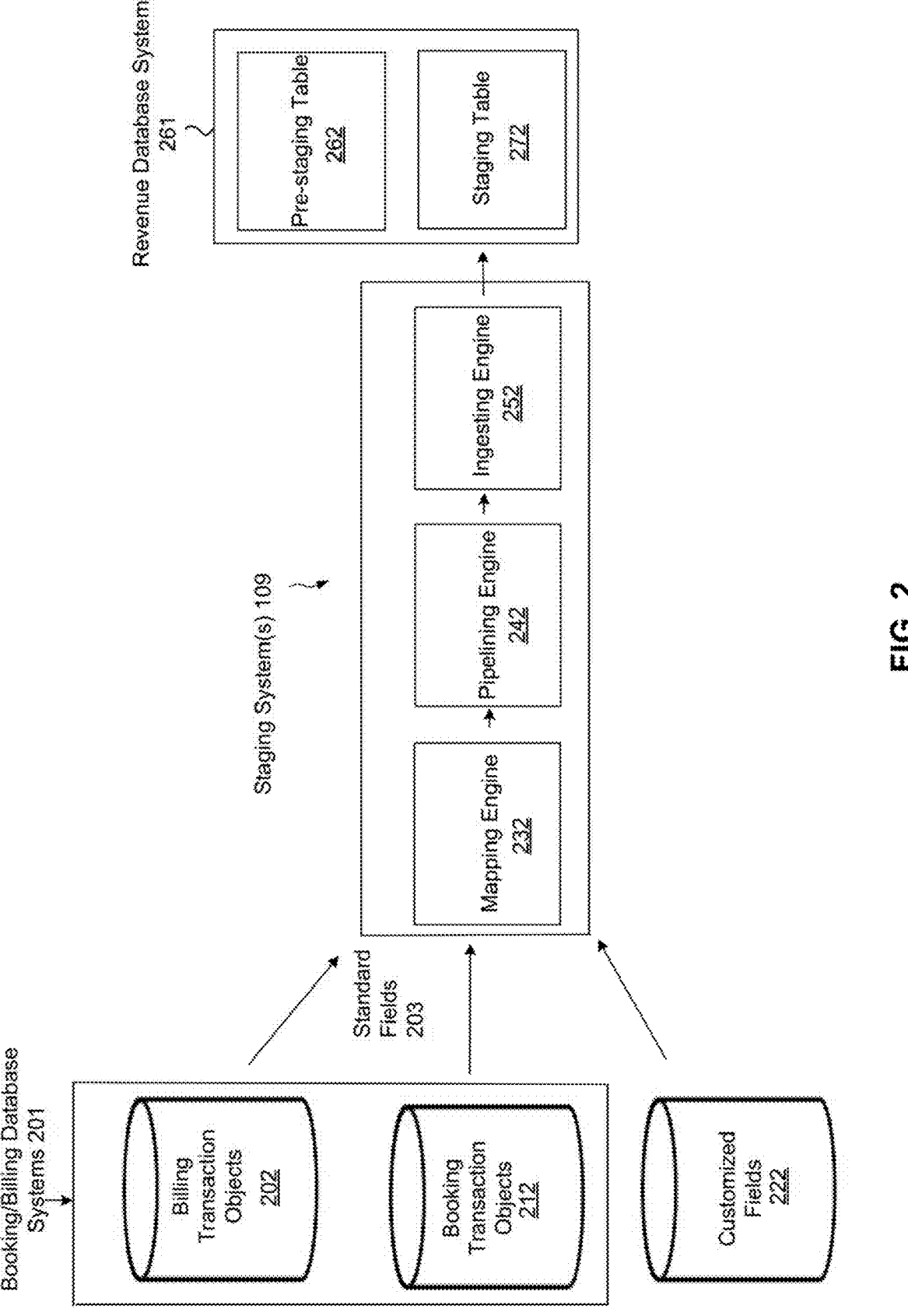
FIG. 2 is a block diagram illustrating staging systems within the multi-tenant system, in context with one or more booking and/or billing database systems and a revenue database system, in accordance with some embodiments of the present invention.

FIG. 2 is a block diagram illustrating details of the staging systems 109, illustrated within a context with one or more booking and/or billing database systems 201 and a revenue database system 261, in accordance with some embodiments of the present invention. FIG. 2 may be implemented in conjunction with any of the other figures (e.g., FIGS. 1, 3, 4, 5A, 5B, 5C, 6A, 6B, 6C). The staging systems 109 include a mapping engine 232, a pipelining engine 242, and an ingesting engine 252. The staging systems 109 may be configured to receive updates as captured by billing transaction objects 202 and/or booking transaction objects 212. The billing transaction objects 202 may provide a transformed object representation of any updates to billing data, such as a billing event. A billing event may include a new billing item (e.g., invoice, credit, or debit memo, or other invoice item), or a modification to an existing billing item. The booking transaction objects 212 may provide a transformed object representation of any updates to booking data, such as a booking event. A booking event may include a new subscription and/or a change to an existing subscription (e.g., a debooking, rebooking, renewal, or early cancellation). The billing transaction objects 202 and/or booking transaction objects 212 may originate from the booking and/or billing database systems 201. The billing transaction objects 202 and/or the booking transaction objects 212 may identify an update, such as a booking or a billing event and fields that define attributes of the booking or billing event. For example, these fields may include a length of a subscription, a subscription period, services provided, costs including fixed costs and variable costs (e.g., overages or installations with uncertain completion dates), payment due dates, and/or statuses of the subscription (e.g., active, scheduled to be cancelled, expired).

The staging systems 109 may extract relevant fields from the billing transaction objects 202 and/or booking transaction objects 212, map the fields to records (e.g., tables, rows, and/or columns) within the revenue database system 261, and push the mapped fields to the records of the revenue database system 261. Relevant fields may include fields that are relevant for a specific purpose for the revenue database system 261, such as for event recognition (e.g., revenue events). For example, the relevant fields may indicate that a revenue event is to be recognized, or potentially to be recognized, a type of the revenue event, an amount corresponding to the revenue event, a time at which the revenue event is to be recognized (e.g., upon contract or subscription, or upon billing), and/or a condition under which the revenue event is to be recognized.

In some embodiments, after the extracting of relevant fields, the staging systems 109 may transform and/or normalize the fields within the billing transaction objects 202 and/or booking transaction objects 212 into a format that is compatible with the revenue database system 261. For example, the staging systems 109 may transform previously non-tabular data within the booking and/or billing transaction objects 202 and/or booking transaction objects 212, as stored within the booking and/or billing database systems 201, into a tabular format. The staging systems 109 may be configured to push the mapped fields by scheduling or implementing a pipeline to ingest the mapped subset of fields to the one or more records within the revenue database system 261. The scheduling of the pipeline may include partitioning the extracted subset of fields according to criteria such as event type.

The revenue database system 261 may be configured to recognize one or more events (e.g., revenue events) resulting from the updates, and/or to perform other workflow operations such as generating reports or other outputs, communication with one or more other database systems, and/or other analysis. In some embodiments, the one or more booking and/or billing database systems 201 and/or the revenue database system 261 may be implemented as part of the server systems 112 or the datastores 114.

The mapping engine 232 includes hardware, software and/or firmware capable of communicating with the tenant interfaces 110, the server systems 112, the datastores 114, the client devices 106, and/or other computing interfaces or APIs, to extract relevant fields from the billing transaction objects 202 and/or booking transaction objects 212. The relevant fields may indicate any data updates, such as updates to booking data, such as a new subscription and/or a change to an existing subscription (e.g., a debooking, rebooking, renewal, or early cancellation). The relevant fields may also indicate any updates to billing data, such as a new billing item (e.g., invoice, credit, or debit memo, or other invoice item), or a modification to an existing billing item. These relevant fields may constitute standard fields (e.g., the standard fields 203) stored or represented within the billing transaction objects 202 and/or booking transaction objects 212. The mapping engine 232 may transform and/or normalize data within the relevant fields into a format that is compatible with the revenue database system 261. For example, the billing transaction objects 202 and/or booking transaction objects 212 may be in a non-tabular format. The mapping engine 232 may facilitate transformation of previously non-tabular data within the billing transaction objects 202 and/or booking transaction objects 212 into a tabular format.

Figure 6A:
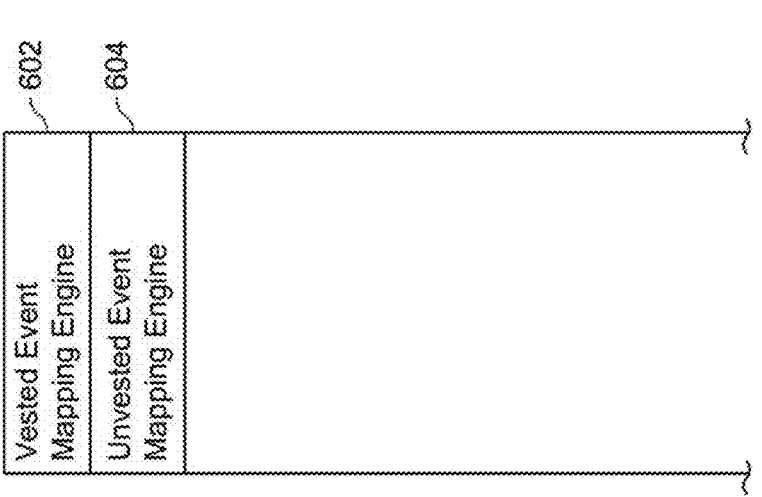
FIG. 6A is a block diagram illustrating a standard field mapping engine within the mapping engine, in accordance with some embodiments of the present invention.

In some embodiments, as illustrated in FIGS. 6A and 6B, the mapping engine 232 may map specific extracted fields within the standard fields 203 to different tables within the revenue database system 261, depending on information content within, or a category or classification of the extracted fields. For example, the mapping engine 232 may map extracted fields corresponding to events that have vested or are scheduled to vest, to a staging table 272. Such events may include, for example, a base subscription fee that is due at an end of a subscription period, such as an end of every month or year. The mapping engine 232 may separately map extracted fields corresponding to unvested events, which are uncertain to vest and/or for which a vesting date is unknown. Such events may include, for example, conditional use terms such as overages. These overages may include a variable fee if an amount of resource usage such as data usage exceeds a base amount during a subscription period. Other examples of unvested events include an installation that has not been completed yet and has an uncertain completion date. The installation may not be billed, and/or may not vest, until completion.

Figure 4:
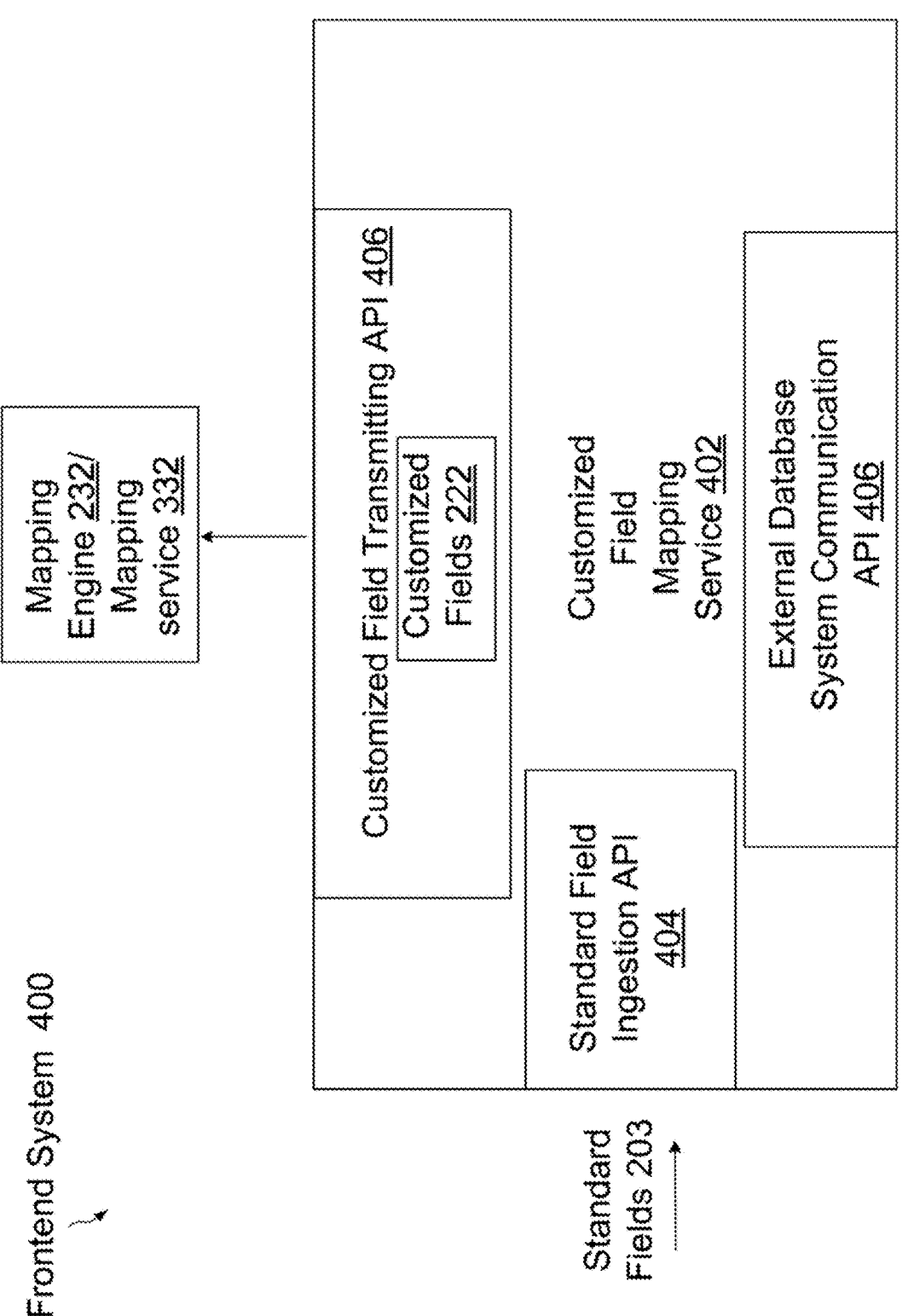
FIG. 4 is a block diagram illustrating a frontend system, which may correspond to a tenant interface and is configured to receive definitions of customized fields and to define mappings of the customized fields to one or more records within the revenue database system, in accordance with some embodiments of the present invention.
Figure 5B:
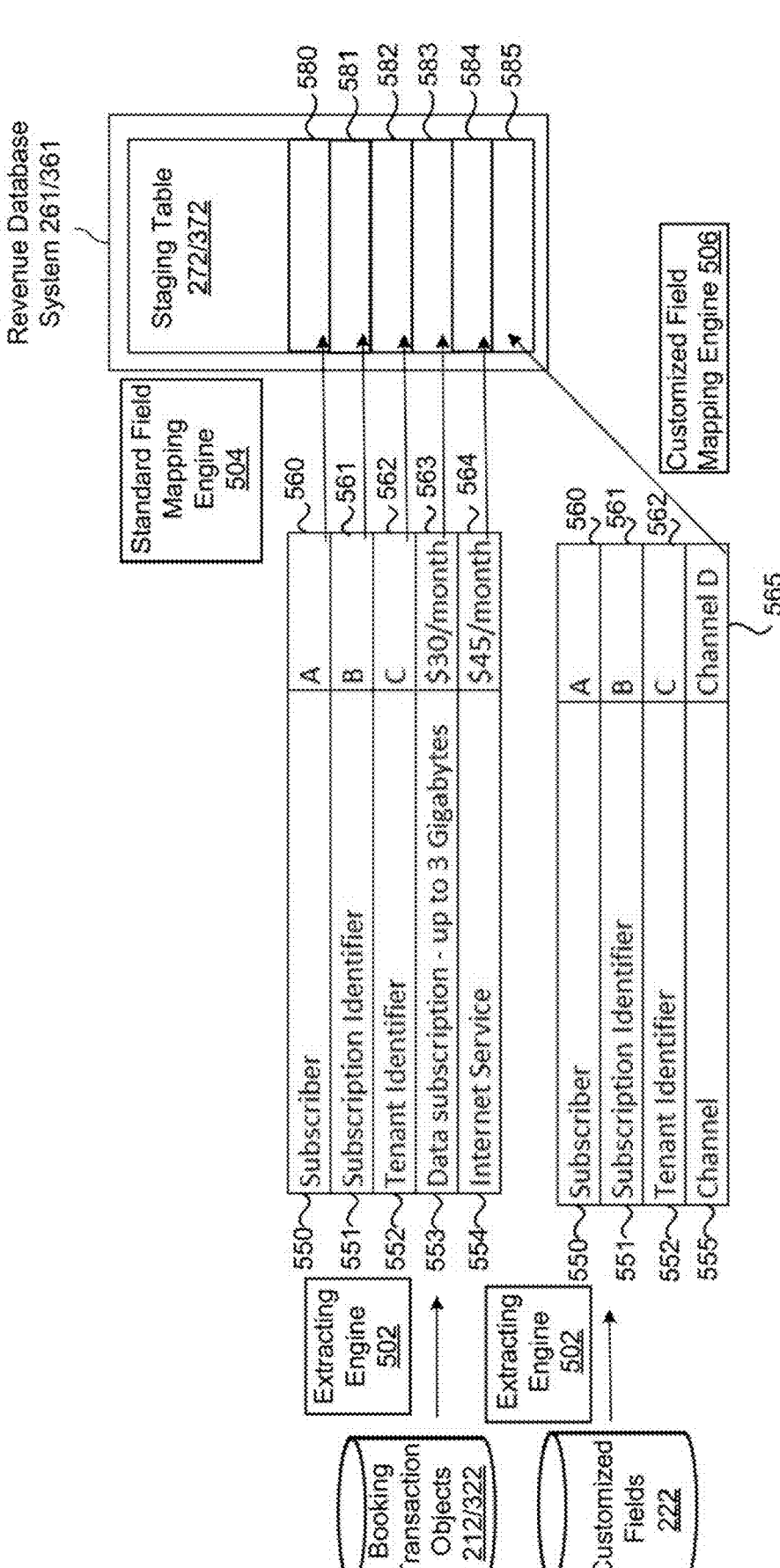
FIG. 5B is a diagram illustrating an example mapping engine, in accordance with some embodiments of the pres-ent invention.

The mapping engine 232 may separately obtain one or more customized fields 222 in addition to the standard fields 203, as illustrated in FIGS. 4 and 5B. The customized fields 222 may be obtained, for example, from the tenant interfaces 110 and/or from other locations within the datastores 114. The customized fields 222 may be selected and/or defined by a tenant via the tenant interfaces 110. A mapping of the customized fields 222 to the records of the revenue database system 261 may also be defined within the tenant interfaces 110. In some embodiments, the customized fields 222 may include a channel (e.g., a sales channel), a geographical region, and/or other data of a subscription or a billing item. The mapping engine 232 may append or join the customized fields 222 to the standard fields 203 if the customized fields 222 correspond to a same subscription as the standard fields 203. The customized fields 222 may be used to enrich outputs of workflows performed within the revenue database system 261. For example, appending the customized fields 222 may enable a report that is generated within the revenue database system 261 to include the customized fields 222.

The pipelining engine 242 includes hardware, software and/or firmware capable of communicating with the tenant interfaces 110, the server systems 112, the datastores 114, the client devices 106, and/or other computing interfaces or APIs, to schedule or implement a pipeline to transmit via pushing of the extracted fields (e.g., the customized fields 222 and/or the standard fields 203) into the particular records of the revenue database system 261, according to the mapping defined by the mapping engine 232 and/or received from the tenant interfaces 110. The pipelining engine 242 may transmit a single message to the revenue database system 261 that corresponds to a related set of fields, which includes the extracted fields. In some embodiments, the pipelining engine 242 may partition the extracted fields by event type. This enables the transmission of all data updates that pertain to a same or similar event type to be within a same partition. In some embodiments, transmission of the extracted fields within different partitions may be performed at least partially in parallel. For example, two distinct event types may include a new subscription a modification to an existing subscription, such as a debooking. Fields corresponding to the new subscription and fields corresponding to the debooking may be separated into different partitions in part because these two different event types have different fields, and/or entail different workflows for the revenue database system 261. The revenue database system 261 may perform a workflow process for the new subscription by generating a revenue recognition event for a new revenue item. The revenue database system 261 may perform a workflow process for the debooking by modifying a status of a previously existing or anticipated revenue event. In this manner, the pipelining engine 242 may partition the data updates based on event type specifically to streamline workflow processes by the revenue database system 261.

In some embodiments, the pipelining engine 242 may be implemented by a group of collaborative servers that facilitate speed, durability, and scalability. The group of collaborative servers may be scalable depending on load. For example, during times of higher load, a number of collaborative servers may be increased, and/or a partition may be modified to be a smaller subset of the original partition, such as event types further divided into a specific tenant, tenant type, or group of tenants.

The ingesting engine 252 includes hardware, software and/or firmware capable of communicating with the tenant interfaces 110, the server systems 112, the datastores 114, the client devices 106, and/or other computing interfaces or APIs, to ingest the extracted fields into the records of the revenue database system 261. The ingesting engine 252 may ingest the extracted fields in specific partitions into specific records or groups of records within the revenue database system 261. The ingesting engine 252 may ingest extracted fields corresponding to or indicating different recognition categories, such as vested compared to unvested, into different tables. For example, extracted fields corresponding to vested revenue events may be ingested into the staging table 272, while extracted fields corresponding to unvested revenue events may be ingested into the pre-staging table 262.

Figure 3:
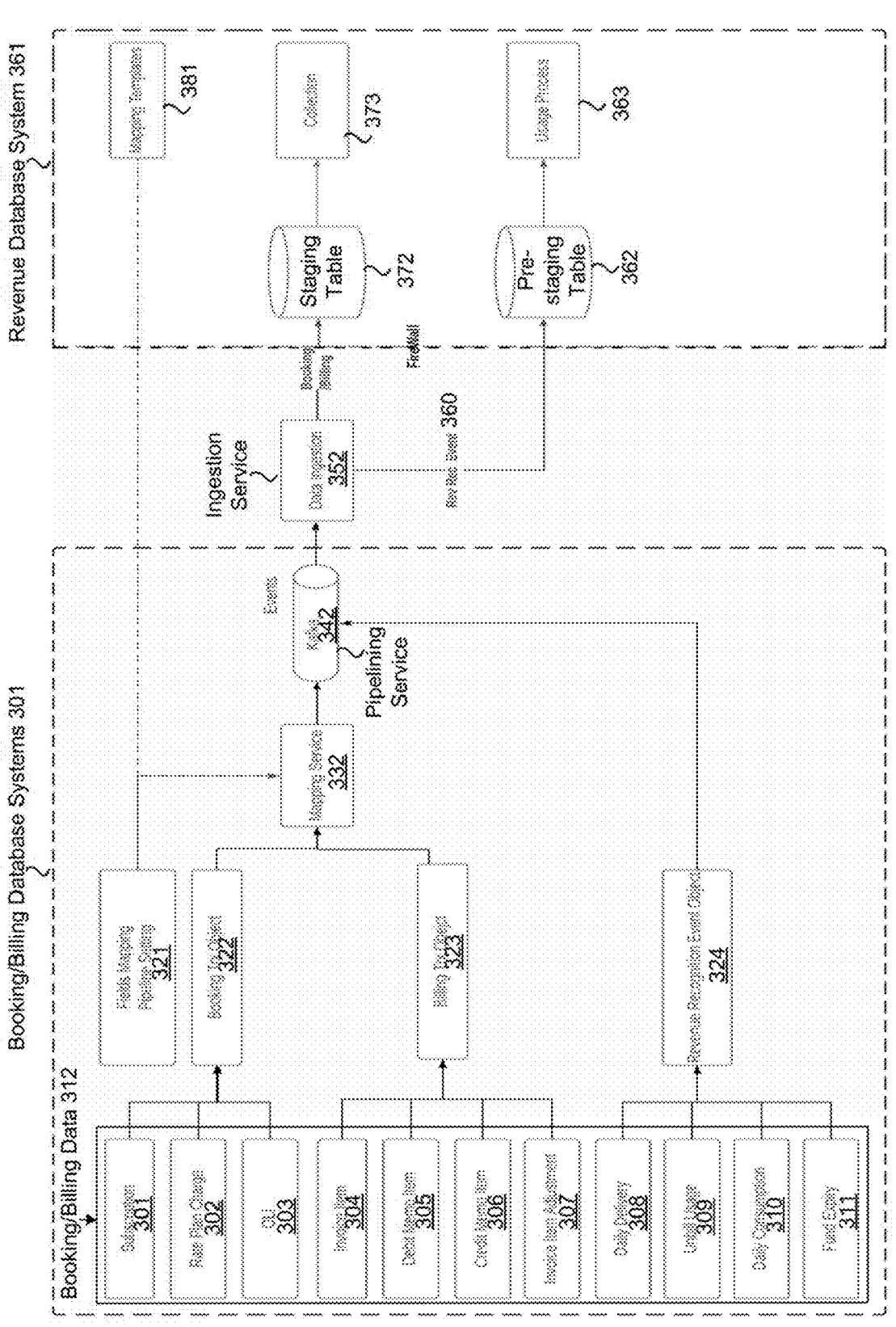
FIG. 3 is a block diagram illustrating staging systems within the multi-tenant system, in context with one or more booking and/or billing database systems and a revenue database system, in accordance with some embodiments of the present invention.

FIG. 3 is a block diagram illustrating details of a system for pushing relevant data updates from the booking and billing database systems 301 to a revenue database system 361. Principles of FIG. 3 may be implemented in conjunction with, and/or as an alternative to, principles of FIG. 2. In FIG. 3, booking and/or billing data 312 may include data regarding a subscription 301, a rate plan change 302, an order line item (OLI) 303, an invoice item 304, a debit memo item 305, a credit memo item 306, an invoice item adjustment 307, a scheduled delivery 308 (e.g., a daily delivery), unbilled usage 309, daily consumption 310, and/ or fund expiry 311. The data regarding the subscription 301, the rate plan change 302, and/or the order line item (OLI) 303, may constitute booking data and be converted or transformed into a booking transaction object 322, which may include a transformed representation of the billing data. The data regarding the invoice item 304, the debit memo item 305, the credit memo item 306, and/or the invoice item adjustment 307 may constitute billing data and be transformed into a billing transaction object 323. In some embodiments, the booking transaction object 322 and/or the billing transaction object 323 may be implemented in a same or similar manner as the billing objects 202 and/or the booking objects 212 of FIG. 2. Information regarding unvested events, in which vesting of the events is uncertain or in which a date of vesting is unknown, may include the scheduled delivery 308, the unbilled usage 309, the daily consumption 310, and/or the fund expiry 311. In some embodiments, the information regarding unvested events may be captured within a revenue recognition event object 324, which may provide a signal or other indication, to the revenue database system 361, once a previously unvested event has vested. The revenue recognition event object 324 may include or identify a particular subscription, a positive vesting of an event, and/or a condition or trigger for vesting of an event.

A mapping service 332 may define a mapping between fields, which are extracted from the booking transaction object 322 and/or the billing transaction object 323, and records within the revenue database system 361. The records may be located, for example, within a staging table 372 and/or a pre-staging table 362. The mapping service 332 may be implemented in a same or similar manner as the mapping engine 232 of FIG. 2. In some embodiments, the defined mapping may be based on a fields mapping pipeline setting 321 within the booking and billing database systems 301 and/or mapping templates 381 within the revenue database system 361. The fields mapping pipeline setting 321 may identify one or more relevant fields within the booking transaction object 322 and/or the billing transaction object 323, and/or relationships between the relevant fields and records within the revenue database system 361. The mapping templates 381 may identify specific records within the revenue database system 361, and their relationships to the relevant fields within the booking transaction object 322 and/or the billing transaction object 323.

The mapping service 332 may map the extracted fields from the booking transaction object 322 and/or the billing transaction object 323 according to the defined mapping. In some embodiments, revenue recognition event objects 324 may not be mapped by the mapping service 332. Instead, the revenue recognition event objects 324 may provide signals to the revenue database system 361 that a previously unvested event has been vested, which may trigger revenue recognition by the revenue database system 361. A pipelining service 342, such as Kafka, may schedule or implement a pipeline to ingest the extracted and mapped fields into the staging table 372 and/or the pre-staging table 362. The pipelining service 342 may be implemented as the pipelining engine 242 of FIG. 2, in some embodiments. A data ingestion service 352 may push the extracted and mapped fields into the staging table 372 and/or the pre-staging table 362. The data ingestion service 352 may be implemented as the ingesting engine 252 of FIG. 2, in some embodiments.

As described in FIG. 2, extracted fields indicative of vested events may be mapped into and ingested into the staging table 372. Once the fields have been ingested into the staging table 372, the fields may be used for a downstream workflow process, such as a collection process 373. Extracted fields indicative of unvested events may be mapped into the pre-staging table 362. A revenue recognition event signal 360, from the revenue recognition events objects 324, may indicate, to the revenue database system 361, of a vesting of an event. For example, the revenue recognition event signal 360 may indicate overage, such as overuse of a subscription resource, beyond a base term of a subscription. This overage may cause an additional revenue recognition event, beyond a base charge of a subscription contract. As another example, the revenue recognition event signal 360 may indicate completion of an installation, which may trigger another revenue recognition event if the revenue is defined to be recognized upon completion. Therefore, the revenue recognition event 360 may provide a signal of additional revenue to be recognized, which was previously unvested. A signal provided by the revenue recognition event 360 may trigger downstream workflows such as usage processing 363. Usage processing 363 may include tracking, logging, and/or generating summaries of usage of a subscription resource for a subscriber under a subscription.

FIG. 4 is a block diagram illustrating details of a frontend system 400, which may be implemented as part of the tenant interfaces 110 in FIG. 1. FIG. 4 may be implemented in conjunction with any of the other figures (e.g., FIGS. 1, 2, 3, 5A, 5B, 5C, 6A, 6B, 6C). FIG. 4 illustrates a system for defining customized fields, which may be received at the datastores 114 and/or the mapping engine 232 after they have been defined. The frontend system 400 may include a customized field mapping service 402 that enables a tenant to define one or more customized fields 222, in addition to the standard fields 203. The customized field mapping service 402 may also enable a tenant to define a mapping of the customized fields 222 to one or more records within the revenue database system 261. The customized field mapping service 402 may include a microservice to facilitate the defining and mapping of the customized fields 222. The customized field mapping service 402 may obtain the standard fields 203, using a standard field ingestion API 404 which communicates with one or more of the booking/billing database systems 201, and/or receives the standard fields 203 from the billing transaction objects 202 and/or the booking transaction objects 212. The standard fields 203 may provide contextual information to a tenant so that a tenant can define the customized fields 222 on top of the standard fields 203.

The customized field mapping service 402 may receive, from the tenant via the tenant interfaces 110, a selection of one or more customized fields 222, as well as a mapping of the selected customized fields 222 to particular records within the revenue database system 261. In some embodiments, information relating to the customized fields 222 may be stored within the one or more datastores 114. In other embodiments, information relating to the customized fields 222 may be stored within an external database system. The customized field mapping service 402 may receive a selection or input of an external database system or source corresponding to the customized fields 222. For example, the selected customized fields 222 may include a channel (e.g., a sales or distribution channel) from which the subscription origination. Information regarding the sales channel may be obtained from an external database system, which may be external to any of the previously described database systems, and/or external to the multi-tenant system 102. The customized field mapping service 402 may include an external database system communication API 406 which may communicate with one or more external database systems to obtain information corresponding to the selected customized fields 222.

The customized field mapping service 402 may implement logic for validations, which ensure appropriately defined mappings. For example, the customized field mapping service 402 may detect an improper attempted mapping based on conflicting data types. Conflicting data types indicate a mismatch between a type or identifier of the customized fields and field types or identifiers supported by columns or rows of the revenue database system 261. Such field types may include a date field type, a name field type, or a number field type. Other validations include duplicate detection, which prohibits an addition of an already existing field, by comparing against the standard fields 203 or a previously added customized field.

FIG. 5A is a diagram illustrating the mapping engine 232 of FIG. 2, in accordance with some embodiments of the present invention. FIG. 5A may be implemented in conjunction with any of the other figures (e.g., FIGS. 1, 2, 3, 5A, 5B, 5C, 6A, 6B, 6C). The mapping engine 232 includes an extracting engine 502, a standard field mapping engine 504, a customized field mapping engine 506, a field appending engine 508, and a communication interface 510. The extracting engine 502 includes hardware, software and/or firmware capable of communicating with the tenant interfaces 110, the server systems 112, the datastores 114, and/or any other systems to identify and extract a subset of relevant fields from the booking transaction objects 212 and/or from the billing transaction objects 202. In some embodiments, the extracted fields may include data that is indicative of an event (e.g., a revenue event), or likely to indicate an event (e.g., above a threshold likelihood or probability), which is recognized by the revenue database system 261. The extracting engine 502 may identify the fields to be extracted based on one or more field types and/or field identifiers. The extracting engine 502 may extract the standard fields 203 from the booking transaction objects 212 and/or from the billing transaction objects 202. The extracting engine 502 may obtain the customized fields 222 from other sources besides the booking transaction objects 212 and/or from the billing transaction objects 202. In some embodiments, the customized fields 222 may be obtained according to a definition received from the tenant interfaces 110. In some embodiments, the customized fields 222 may be obtained from the datastores 114 or an external database system.

The standard field mapping engine 504 includes hardware, software and/or firmware capable of communicating with the server systems 112, the datastores 114, the extracting engine 502, and/or any other systems to map the standard fields 203 to records within the revenue database system 261. The standard fields 203 may be originally obtained from the billing transaction objects 202 and/or the booking transaction objects 212. The standard field mapping engine 504 may transform and/or normalize the standard fields, which may previously have been in a non-tabular format, into a tabular format, or a format that is compatible with the revenue database system 261. The standard field mapping engine 504 may map the extracted standard fields 203 to one or more particular records, such as columns or rows within the revenue database system 261. This mapping may be defined by a relationship between a field label or field identifier with a particular record label or record identifier within the revenue database system 261.

The customized field mapping engine 506 includes hardware, software and/or firmware capable of communicating with the tenant interfaces 110, the server systems 112, the datastores 114, the extracting engine 502, and/or any other systems to map any customized fields (e.g., the customized fields 222) to records within the revenue database system 261. In some embodiments, the mapping of the customized fields 222 to specific columns or rows within the revenue database system 261 may be defined and validated, for example, within the frontend systems 400 and/or the tenant interfaces 110.

The field appending engine 508 includes hardware, software and/or firmware capable of communicating with the tenant interfaces 110, the server systems 112, the datastores 114, and/or the staging systems 109 (e.g., the extracting engine 502, the standard field mapping engine 504, and/or the customized field mapping engine 506) to append any customized fields 222 to the standard fields 203. The customized fields 222 may correspond to a same event as the standard fields 203. For example, an event may include a particular subscription for a particular subscriber. Thus, the customized fields 222 corresponding to the particular subscription may be appended to standard fields 203 that also correspond to the particular subscription. Once the customized fields 222 have been appended to the standard fields 203, the appended fields (e.g., the customized fields 222 and the standard fields 203 appended together) may be scheduled for pipelining and ingested into the revenue database system 261.

The communication interface 510 may include APIs and be configured to communicate with the tenant interfaces 110, the server systems 112, and/or the datastores 114.

FIG. 5B is a diagram illustrating an example mapping engine 232, specifically, the extracting engine 502, the standard field mapping engine 504 and the customized field mapping engine 506, in accordance with some embodiments of the present invention. FIG. 5B may be implemented in conjunction with any of the other figures (e.g., FIGS. 1, 2, 3, 5A, 5C, 6A, 6B, 6C). In FIG. 5B, the extracting engine 502 may extract, from the booking transaction objects 212, relevant fields including fields 560, 561, 562, 563, and/or 564, corresponding to field identifiers 550, 551, 552, 553, and/or 554, respectively. The field identifiers 550, 551, 552, 553, and 554 indicate a particular subscriber or a particular subscriber identifier, a subscription identifier, a tenant or tenant identifier, one or more terms of a data subscription, and one or more terms of an internet service. The fields 560, 561, 562, 563, and 564 indicate a particular subscriber A, a subscription identifier B, a tenant identifier C, a cost of a data subscription of $30 per month, and a cost of an internet service of $45 per month. Here, the fields 560, 561, and 562 are used to identify a particular subscription, while the fields 563 and 564 indicate terms of the subscription which may trigger a revenue recognition event. The standard field mapping engine 504 may map the fields 560, 561, 562, 563, and/or 564 into records 580, 581, 582, 583, and/or 584, respectively, of the staging table 272 within the revenue database system 261. Although not shown, the staging table 272 may also include record identifiers analogous or similar to the field identifiers 550, 551, 552, 553, and/or 554.

The extracting engine 502 may obtain the customized fields 222, which, as explained in FIG. 2, may be defined within the tenant interfaces 110. The customized fields 222 may include a field 565 which indicates a channel D as a sales channel from which the subscriber A subscribed to the subscription B. The field 565 may correspond to a field identifier 555, indicating that the field 565 has information that identifies the channel. In some embodiments, the customized fields may also include the fields 560, 561, and 562 which indicate the particular subscriber A, the subscription identifier B, and the tenant identifier C. The customized field mapping engine 506 may obtain a mapping, from the tenant interfaces 110, between the field 565 and a record 585 within the staging table 272. In some embodiments, the customized field mapping engine 506 may obtain a mapping between the fields 560, 561, and 562 into the records 580, 581, and 582.

Figure 5C:
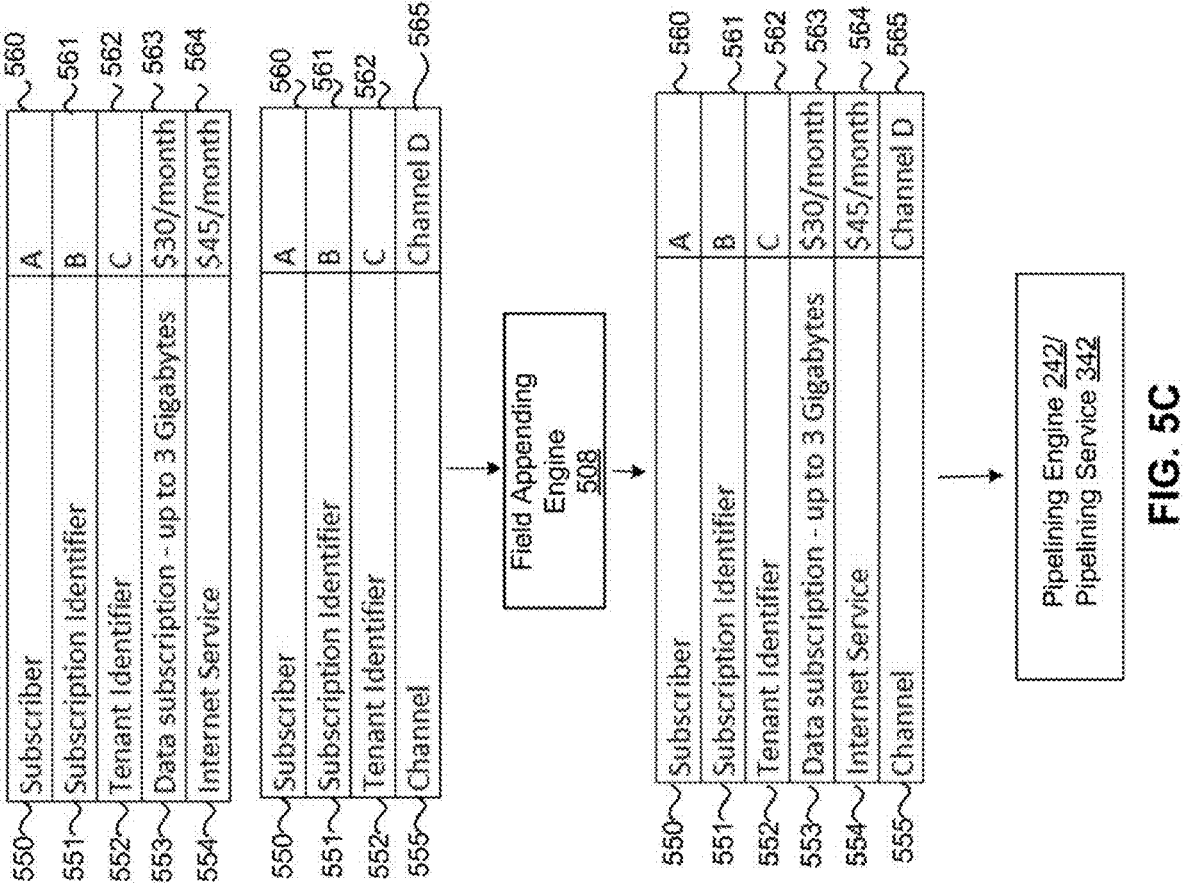
FIG. 5C is a diagram illustrating an example mapping engine, in accordance with some embodiments of the pres-ent invention.

FIG. 5C is a diagram illustrating an example mapping engine 232, specifically, the field appending engine 508, in accordance with some embodiments of the present invention. FIG. 5C may be implemented in conjunction with any of the other FIGS. (e.g., FIGS. 1, 2, 3, 5A, 5B, 6A, 6B, 6C). In FIG. 5C, the field appending engine 508 determines or receives an indication that the field 565 is mapped to the same staging table 272 or a same group of records within the same staging table 272 as the fields 561-564. Additionally or alternatively, the field appending engine 508 determines or receives an indication that the subscriber, subscription identifier, and/or the tenant identifier, as indicated by the fields 560, 561, and 562, are matching for both the standard fields 563 and 564, and the customized field 565. Upon this determination, the field appending engine 508 may append or join the standard fields 563-564 to the customized field 565. Appending the standard fields 563-564 to the customized field 565 facilitates efficient pipelining of the appended fields. The pipelining engine 242 may schedule a pipeline operation to ingest the appended fields, and transmit a single message to the revenue database system 261 regarding the appended fields.

FIG. 6A is a diagram illustrating the standard field mapping engine 504, in accordance with some embodiments of the present invention. FIG. 6A may be implemented in conjunction with any of the other figures (e.g., FIGS. 1, 2, 3, 5A, 5B, 5C, 6B, 6C). The standard field mapping engine 504 includes a vested event mapping engine 602 and an unvested event mapping engine 604. The vested event mapping engine 602 includes hardware, software and/or firmware capable of communicating with the tenant interfaces 110, the server systems 112, and/or the datastores 114 to map, or receive a mapping of, any fields that correspond to or indicate a vested event to the staging table 272 of the revenue database system 261. A vested event is an event that is scheduled to occur at a known day or time or has occurred, such as a revenue event (e.g., an end of a subscription cycle). The mapping may define a relationship between the fields and one or more particular records (e.g., rows or columns) within the staging table 272.

The unvested event mapping engine 604 includes hardware, software and/or firmware capable of communicating with the tenant interfaces 110, the server systems 112, and/or the datastores 114 and/or to any external database systems to map, or receive a mapping definition of, any fields that correspond to or indicate an unvested event. The mapping may define a relationship between the fields and one or more particular records (e.g., rows or columns) within the pre-staging table 262.

FIG. 6B is a diagram illustrating an example mapping engine 232, specifically, the vested event mapping engine 602, in accordance with some embodiments of the present invention. FIG. 6B may be implemented in conjunction with any of the other figures (e.g., FIGS. 1, 2, 3, 5A, 5B, 5C, 6A, 6C). In FIG. 6B, the mapping engine 232 may extract, from the booking transaction objects 212, relevant fields including fields 620, 621, 622, 623, 624, 625, and/or 626, corresponding to field identifiers 610, 611, 612, 613, 614, 615, and/or 616, respectively. The field identifiers 610, 611, 612, 613, 614, 615, and/or 616 indicate a particular subscriber or a particular subscriber identifier, a subscription identifier, a tenant or tenant identifier, one or more terms of a data subscription, one or more terms of equipment installation, one or more terms of overage, and one or more terms of an internet service. The fields 620, 621, 622, 623, 624, 625, and/or 626 indicate a particular subscriber A, a subscription identifier B, a tenant identifier C, a cost of a data subscription of $30 per month, a cost of installation being $79, a cost of overage (e.g., exceeding 3 Gb in a month) to be $5 per month, and a cost of an internet service of $45 per month. Here, the fields 620, 621, and 622 are used to identify a particular subscription, while the fields 623, 624, 625, and 626 indicate terms of the subscription which may trigger a revenue recognition event. The vested event mapping engine 602 may map fields corresponding to vested events into records within the staging table 272. In particular, the fields corresponding to vested events may include the fields 623 and 626, because those fields indicate fixed terms of the contract, for which revenue is recognized and vested at a specific date. This date occurs either upon the contract commencing (e.g., a subscription or subscription period commencing) or upon an invoice being sent at the beginning of a subsequent subscription period. The vested event mapping engine 602 maps the fields 623 and 626 to records 623 and 696 of the staging table 272. Additionally, the vested event mapping engine 602 may map the fields 620, 621, and 622 into records 690, 691, and 692, respectively, to indicate subscription identification information.

Figure 6C:
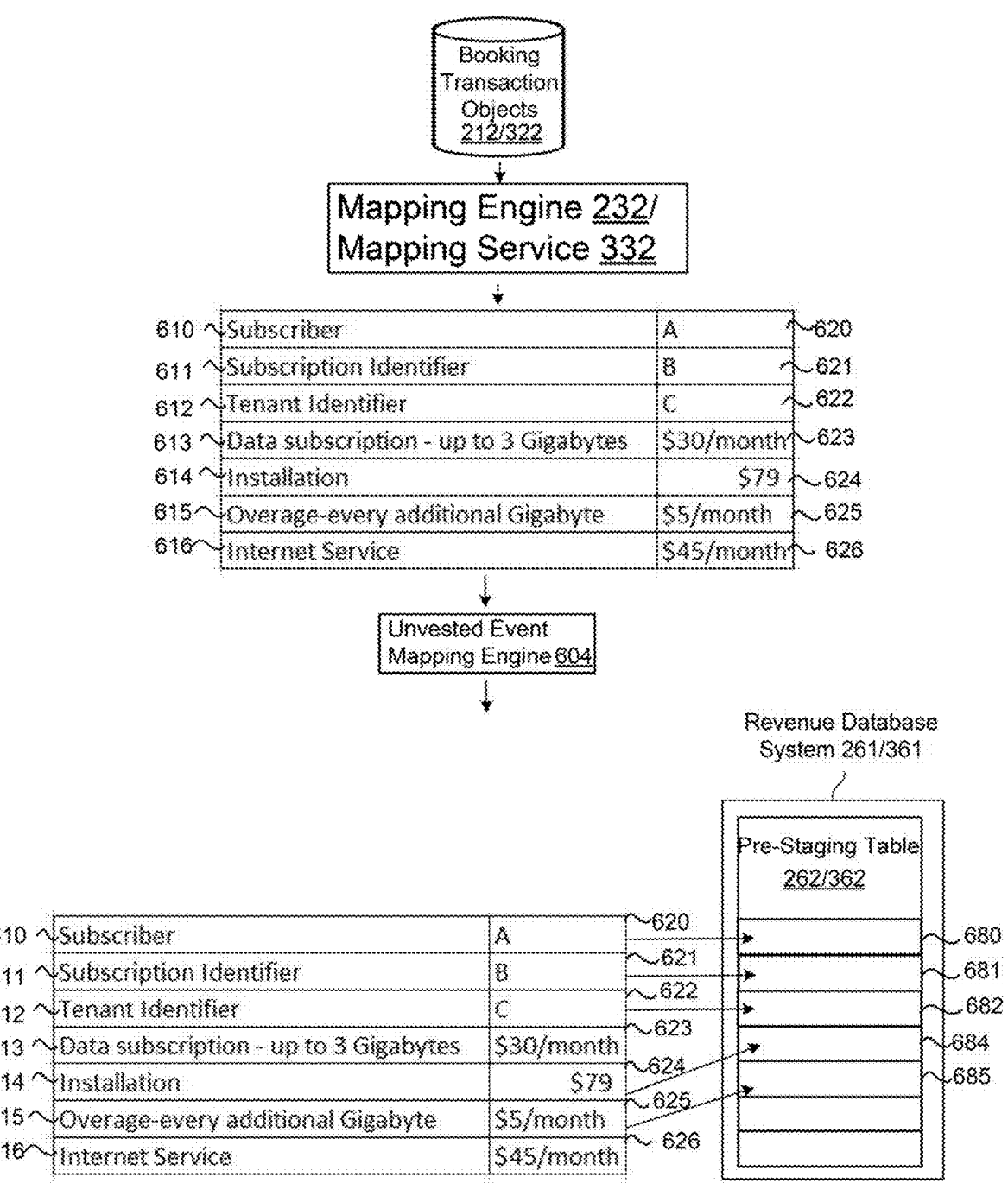
FIG. 6C is a block diagram illustrating an example standard field mapping engine, in accordance with some embodiments of the present invention.

FIG. 6C is a diagram illustrating an example mapping engine 232, specifically, the unvested event mapping engine 604, in accordance with some embodiments of the present invention. FIG. 6C may be implemented in conjunction with any of the other figures (e.g., FIGS. 1, 2, 3, 5A, 5B, 5C, 6A, 6B). In FIG. 6C, the mapping engine 232 may extract, from the booking transaction objects 212, relevant fields including fields 620, 621, 622, 623, 624, 625, and/or 626, corresponding to field identifiers 610, 611, 612, 613, 614, 615, and/or 616, respectively, just as in FIG. 6B. The unvested event mapping engine 604 may map fields corresponding to unvested events into records within the pre-staging table 262. In particular, the fields corresponding to unvested events may include the fields 624 and 625, because those fields indicate terms of the contract, for which revenue recognition is uncertain, or occurs at an uncertain date. For example, overage is uncertain to occur, because a subscriber may not consume excess data. In addition, installation, for which revenue is defined to be recognized upon completion, has an uncertain completion date. The unvested event mapping engine 602 maps the fields 624 and 625 to records 684 and 685 of the pre-staging table 262. Additionally, the unvested event mapping engine 604 may map the fields 620, 621, and 622 into records 680, 681, and 682, respectively, to indicate subscription identification information. In this manner, as illustrated in FIGS. 6B and 6C, fields corresponding to vested events are mapped to a separate table as fields corresponding to unvested events. This facilitates the revenue database system 261 performing different workflows for vested events compared to unvested events, and avoids the revenue database system 261 having to separate vested events from unvested events. For example, the revenue database system 261 may recognize revenue corresponding to an unvested event upon receiving a revenue recognition event signal 360, as described in FIG. 3.

FIG. 7 is a flowchart of a method 700 of staging a revenue database system (e.g., the revenue database system 261 in FIG. 2) in response to receiving the billing transaction objects 202 and/or the booking transaction objects 212 which may be stored in the booking and/or billing database systems 201, in accordance with some embodiments of the present invention. FIG. 7 may be implemented in conjunction with any of the other FIGS. (e.g., FIGS. 1, 2, 3, 5A, 5B, 5C, 6A, 6B, 6C). In this and other flowcharts and/or sequence diagrams, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

The method 700 begins with one or more hardware processors (e.g., the extracting engine 402) extracting, from the booking and/or billing database systems 201, the relevant standard fields 203 from the billing transaction objects 202 and/or the booking transaction objects 212 in step 702. The extracted standard fields 203 may indicate or correspond to one or more upstream event types (e.g., a new subscription, a modification of an existing subscription, a new invoice or other billing item being generated, and/or a modification to an existing invoice). The extracted standard fields 203 may include specific field identifiers. The extracted standard fields may include data that triggers, or potentially triggers, one or more downstream events at the revenue database system 261. The one or more downstream events may include a revenue recognition event.

In step 703, the standard field mapping engine 404 may map the standard fields 203 to one or more records (e.g., rows or columns) within the revenue database system 261, as described, for example, within FIGS. 6A-6C. In step 704, the extracting engine 402 may obtain, from the tenant interface 110, the customized fields 222 that are defined by a particular tenant. The customized field mapping engine 406 may obtain a validated mapping of the customized fields 222 to the one or more records within the revenue database system 261, in step 706. In step 708, the field appending engine 408 may, upon identifying that the customized fields 222 and the standard fields 203 share same subscription identification information, append the customized fields 222 to the standard fields 203. Appending the customized fields 222 to the standard fields 203 results in the appended fields being pipelined and ingested together. In step 710, the pipelining engine 242 configures or schedules a pipeline to ingest the appended fields to the revenue database system 261. The pipelining includes sending a single message to the revenue database system 261 regarding a scheduled ingestion of the appended fields. The pipelining also includes partitioning the appended fields according to event type. In some examples, each event type, or a group of event types, may constitute a same partition. Different event types, or different groups of event types, may constitute separate partitions. Separate partitions may be pipelined at least partially in parallel. In step 712, the ingesting engine 252 ingests the standard and customized fields by pushing the fields to specific tables (e.g., the staging table 272, the pre-staging table 262) of the revenue database system 261, as previously described in FIGS. 5A-5C.

Figure 8:
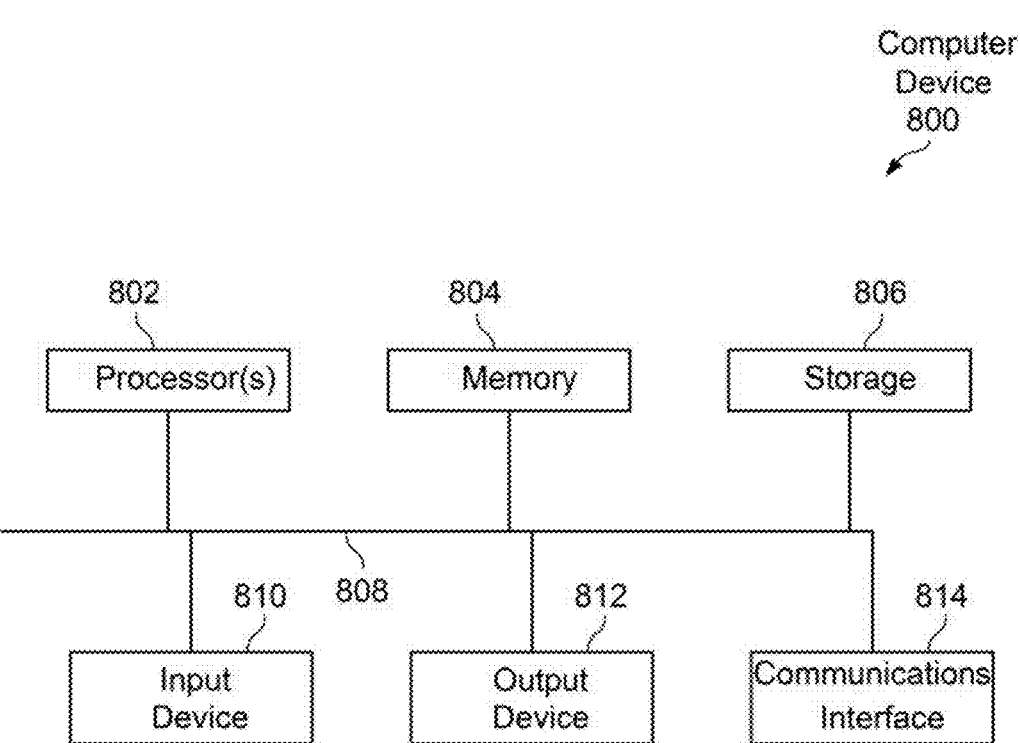
FIG. 8 is a block diagram illustrating details of a com-puting system.

FIG. 8 is a block diagram of a computing device 800. Any of the systems, engines, datastores, and/or networks described herein may comprise an instance of one or more computing devices 800. In some embodiments, functionality of the computing device 800 is improved to perform some or all of the functionality described herein. The computing device 800 comprises a processor 802, memory 804, storage 806, an input device 810, a communication network interface 814, and an output device 812 communicatively coupled to a communication channel 808. The processor 802 is configured to execute executable instructions (e.g., programs). In some embodiments, the processor 802 comprises circuitry or any processor capable of processing the executable instructions.

The memory 804 stores data. Some examples of memory 804 include storage devices, such as RAM, ROM, RAM cache, virtual memory, etc. In various embodiments, working data is stored within the memory 804. The data within the memory 804 may be cleared or ultimately transferred to the storage 806.

The storage 806 includes any storage configured to retrieve and store data. Some examples of the storage 806 include flash drives, hard drives, optical drives, cloud storage, and/or magnetic tape. In some embodiments, storage 806 may include RAM. Each of the memory 804 and the storage 806 comprises a computer-readable medium, which stores instructions or programs executable by processor 802.

The input device 810 may be any device that inputs data (e.g., mouse and keyboard). The output device 812 may be any device that outputs data and/or processed data (e.g., a speaker or display). It will be appreciated that the storage 806, input device 810, and output device 812 may be optional. For example, the routers/switchers may comprise the processor 802 and memory 804 as well as a device to receive and output data (e.g., the communication network interface 814 and/or the output device 812).

The communication network interface 814 may be coupled to a network (e.g., the network system 100) via the link 808. The communication network interface 814 may support communication over an Ethernet connection, a serial connection, a parallel connection, and/or an ATA connection. The communication network interface 814 may also support wireless communication (e.g., 802.11 a/b/g/n, WiMax, LTE, WiFi). It will be apparent that the communication network interface 814 may support many wired and wireless standards.

It will be appreciated that the hardware elements of the computing device 800 are not limited to those depicted. A computing device 800 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 802 and/or a co-processor located on a GPU (i.e., NVidia).

It will be appreciated that an "engine," "system," "datastore," and/or "database" may comprise software, hardware, firmware, service, microservice, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance. It will be appreciated that the term "request" shall include any computer request or instruction, whether permissive or mandatory.

The databases/datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A multi-tenant system, comprising:

one or more hardware processors; and memory storing computer instructions, wherein the computer instructions, when executed by the one or more hardware processors, cause the one or more hardware processors to perform operations comprising:

extracting one or more standard fields from one or more objects stored in one or more source database systems, the standard fields defining standard subscription attributes;

mapping the one or more standard fields to one or more records within a destination database system, wherein the one or more records comprise columns or rows within a table, and wherein mapping the one or more standard fields to the one or more records comprises selecting a particular table within the destination database system into which a particular standard field of the standard fields is ingested based on a classification of the particular standard field, wherein the classification is indicative of a vesting status corresponding to the standard field, the vesting status indicating whether the particular standard field corresponds to a vesting event;

obtaining one or more customized fields, the one or more customized fields defining tenant-selected subscription attributes;

obtaining a mapping of the one or more customized fields to the one or more records;

appending the one or more standard fields to the one or more customized fields to form appended fields;

scheduling a pipeline to ingest the appended fields into the one or more records within the destination database system; and ingesting the appended fields into the one or more records within the destination database system in order to stage the appended fields into the destination database system.

2. The multi-tenant system of claim 1, wherein the mapping of the one or more standard fields to the one or more records based on the classification comprises mapping a standard field to a staging table if the standard field corresponds to a vesting event and mapping the standard field to a pre-staging table if the standard field corresponds to a nonvesting event.

3. The multi-tenant system of claim 1, wherein the one or more standard fields comprise one or more first standard fields, the one or more customized fields comprise one or more first customized fields, the one or more first standard fields corresponding to a first event of a first event type, the one or more records comprises one or more first records; and the computer instructions when executed by the one or more hardware processors are further configured to perform:

extracting one or more second standard fields corresponding to a second event from one or more source database systems, the second event being of a second event type; and mapping the one or more second standard fields to one or more second records within the destination database system, and wherein the scheduling of the pipeline comprises partitioning the appended first fields and the one or more second standard fields based on different event types.

4. The multi-tenant system of claim 3, wherein the scheduling of the pipeline comprises partitioning the appended first fields into a separate partition as the one or more second standard fields.

5. The multi-tenant system of claim 1, wherein the one or more records comprise a row or a column.

6. The multi-tenant system of claim 1, wherein the instructions when executed by the one or more hardware processors are further configured to perform:

normalizing the extracted one or more standard fields and the obtained one or more customized fields according to a standardized format compatible with the destination database system.

7. The multi-tenant system of claim 1, wherein the destination database system is configured to recognize events based on the ingested appended fields and perform workflow operations based on the recognized events.

8. The multi-tenant system of claim 7, wherein the one or more customized fields are included in an output of the performed workflow operations.

9. A method implemented by a multi-tenant system comprising a plurality of computers, the method comprising:

extracting one or more standard fields from one or more objects stored in one or more source database systems, the standard fields defining standard subscription attributes;

mapping the one or more standard fields to one or more records within a destination database system, wherein the one or more records comprises columns or rows within a table, and wherein mapping the one or more standard fields to the one or more records comprises selecting a particular table within the destination database system into which a particular standard field of the standard fields is ingested based on a classification of the particular standard field, wherein the classification is indicative of a vesting status corresponding to the standard field, the vesting status indicating whether the particular standard field corresponds to a vesting event;

obtaining one or more customized fields, the one or more customized fields defining tenant-selected subscription attributes;

obtaining a mapping of the one or more customized fields to the one or more records;

appending the one or more standard fields to the one or more customized fields to form appended fields;

scheduling a pipeline to ingest the appended fields into the one or more records within the destination database system; and ingesting the appended fields into the one or more records within the destination database system in order to stage the appended fields into the destination database system.

10. The method of claim 9, wherein the mapping of the one or more standard fields to the one or more records based on the classification comprises mapping a standard field to a staging table if the standard field corresponds to a vesting event and mapping the standard field to a pre-staging table if the standard field corresponds to a nonvesting event.

11. The method of claim 9, wherein the one or more standard fields comprise one or more first standard fields, the one or more customized fields comprise one or more first customized fields, the one or more first standard fields corresponding to a first event of a first event type, the one or more records comprises one or more first records; and the method further comprises:

extracting one or more second standard fields corresponding to a second event from one or more source database systems, the second event being of a second event type; and mapping the one or more second standard fields to one or more second records within the destination database system, and wherein the scheduling of the pipeline comprises partitioning the appended first fields and the one or more second standard fields based on different event types.

12. The method of claim 11, wherein the scheduling of the pipeline comprises partitioning the appended first fields into a separate partition as the one or more second standard fields.

13. The method of claim 9, wherein the one or more records comprise a row or a column.

14. The method of claim 9, further comprising:

normalizing the extracted one or more standard fields and the obtained one or more customized fields according to a standardized format compatible with the destination database system.

15. The method of claim 9, further comprising:

recognizing, by the destination database system, events based on the ingested appended fields and performing workflow operations based on the recognized events.

16. The method of claim 15, wherein the one or more customized fields are included in an output of the performed workflow operations.

17. A multi-tenant system, comprising:

one or more hardware processors; and memory storing computer instructions, wherein the computer instructions, when executed by the one or more hardware processors, cause the one or more hardware processors to perform operations comprising:

extracting one or more standard fields from one or more objects stored in one or more source database systems, the standard fields defining standard subscription attributes;

mapping the one or more standard fields to one or more records within a destination database system;

obtaining one or more customized fields, the one or more customized fields defining tenant-selected subscription attributes;

obtaining a mapping of the one or more customized fields to the one or more records;

appending the one or more standard fields to the one or more customized fields to form appended fields;

scheduling a pipeline to ingest the appended fields into the one or more records within the destination database system; and ingesting the appended fields into the one or more records within the destination database system in order to stage the appended fields into the destination database system, wherein the destination database system is configured to recognize events based on the ingested appended fields and to perform workflow operations based on the recognized events.

18. A method implemented by a multi-tenant system comprising a plurality of computers, the method comprising:

extracting one or more standard fields from one or more objects stored in one or more source database systems, the standard fields defining standard subscription attributes;

mapping the one or more standard fields to one or more records within a destination database system;

obtaining one or more customized fields, the one or more customized fields defining tenant-selected subscription attributes;

obtaining a mapping of the one or more customized fields to the one or more records;

appending the one or more standard fields to the one or more customized fields to form appended fields;

scheduling a pipeline to ingest the appended fields into the one or more records within the destination database system;

ingesting the appended fields into the one or more records within the destination database system in order to stage the appended fields into the destination database system; and recognizing, by the destination database system, events based on the ingested appended fields and performing workflow operations based on the recognized events.

\* \* \* \* \*